(12) United States Patent
Fujiki et al.

(10) Patent No.: US 12,119,479 B2
(45) Date of Patent: Oct. 15, 2024

(54) ANODE FOR ALL SOLID-STATE SECONDARY BATTERY, ALL SOLID-STATE SECONDARY BATTERY INCLUDING THE ANODE, AND METHOD OF MANUFACTURING THE ANODE

(71) Applicant: Samsung Electronics Co., Ltd., Suwon-si (KR)

(72) Inventors: Satoshi Fujiki, Yokohama (JP); Seitaro Ito, Yokohama (JP); Taku Watanabe, Yokohama (JP); Yuichi Aihara, Yokohama (JP); Takanobu Yamada, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 175 days.

(21) Appl. No.: 17/471,268

(22) Filed: Sep. 10, 2021

(65) Prior Publication Data
US 2021/0408523 A1    Dec. 30, 2021

Related U.S. Application Data

(62) Division of application No. 15/890,472, filed on Feb. 7, 2018, now abandoned.

(30) Foreign Application Priority Data

Feb. 7, 2017   (JP) ................................. 2017-020721
Jul. 26, 2017  (KR) ........................ 10-2017-0094965

(51) Int. Cl.
*H01M 4/134*   (2010.01)
*H01M 4/04*    (2006.01)
(Continued)

(52) U.S. Cl.
CPC ......... *H01M 4/134* (2013.01); *H01M 4/0404* (2013.01); *H01M 4/1395* (2013.01);
(Continued)

(58) Field of Classification Search
None
See application file for complete search history.

(56) References Cited

U.S. PATENT DOCUMENTS 4,645,726 A    2/1987 Hiratani et al.
6,207,327 B1   3/2001 Takada et al.
(Continued)

FOREIGN PATENT DOCUMENTS

JP    1997245828 A    9/1997
JP    1998302776 A    11/1998
(Continued)

OTHER PUBLICATIONS

Japanese Office Action for Japanese Patent Application No. 2017-020721 dated Dec. 2, 2021.
(Continued)

*Primary Examiner* — Zhongqing Wei
(74) *Attorney, Agent, or Firm* — CANTOR COLBURN LLP

(57) ABSTRACT

An anode for an all solid-state secondary battery, the anode including an anode collector, and coating lithium distribution layer disposed on the anode collector, wherein the lithium distribution layer includes a metal capable of forming an alloy with lithium.

10 Claims, 8 Drawing Sheets

(51) Int. Cl.
   *H01M 4/1395*   (2010.01)
   *H01M 4/38*    (2006.01)
   *H01M 10/0525* (2010.01)
   *H01M 10/44*   (2006.01)
   *H01M 4/02*        (2006.01)
   *H01M 4/42*        (2006.01)
   *H01M 4/66*        (2006.01)

(52) U.S. Cl.
   CPC ......... *H01M 4/38* (2013.01); *H01M 10/0525* (2013.01); *H01M 10/44* (2013.01); *H01M 2004/027* (2013.01); *H01M 4/387* (2013.01); *H01M 4/42* (2013.01); *H01M 4/661* (2013.01); *H01M 2300/0068* (2013.01)

(56) References Cited

U.S. PATENT DOCUMENTS

| | | |
|---|---|---|
| 2007/0259271 A1 | 11/2007 | Nanno et al. |
| 2014/0093786 A1* | 4/2014 | Ito .................. H01M 4/131 429/223 |
| 2015/0325877 A1* | 11/2015 | Nizou ............... H01M 4/0404 429/162 |
| 2016/0172704 A1 | 6/2016 | Watanabe et al. |

FOREIGN PATENT DOCUMENTS

| | | | |
|---|---|---|---|
| JP | 11297359 | A | 10/1999 |
| JP | 2002-280073 | A | 9/2002 |
| JP | 2004087402 | A | 3/2004 |
| JP | 2004164865 | A | 6/2004 |
| JP | 2006164695 | A | 6/2006 |
| JP | 2007005279 | A | 1/2007 |
| JP | 2009054484 | A | 3/2009 |
| JP | 2009093968 | A | 4/2009 |
| JP | 2009211910 | A | 9/2009 |
| JP | 2009218005 | A | 9/2009 |
| JP | 2009301959 | A | 12/2009 |
| JP | 2013080669 | A * | 5/2013 |
| JP | 5561029 | B2 | 6/2014 |
| JP | 2017020721 | A | 1/2017 |
| WO | 2013141241 | A1 | 9/2013 |
| WO | 2015029103 | A1 | 3/2015 |

OTHER PUBLICATIONS

Korean Office Action for Korean Patent Application No. 10-2017-0094965 dated Apr. 6, 2022.

Liang et al., "Composite lithium metal anode by melt infusion of lithium into a 3D conducting scaffold with lithiophilic coating", PNAS, vol. 113, No. 11, Mar. 15, 2016, 2862-2867.

* cited by examiner

ANODE FOR ALL SOLID-STATE SECONDARY BATTERY, ALL SOLID-STATE SECONDARY BATTERY INCLUDING THE ANODE, AND METHOD OF MANUFACTURING THE ANODE

CROSS-REFERENCE TO RELATED APPLICATIONS

This application is a divisional application of U.S. application Ser. No. 15/890,472 filed on Feb. 7, 2018 in the United States Patent and Trademark Office, which claims priority to and the benefit of Japanese Patent Application No. 2017-020721, filed on Feb. 7, 2017, in the Japanese Patent Office and Korean Patent Application No. 10-2017-0094965, filed on Jul. 26, 2017, in the Korean Intellectual Property Office, and all the benefits accruing therefrom under 35 U.S.C. § 119, the contents of which are incorporated herein in their entireties by reference.

BACKGROUND

1. Field

The present disclosure relates to an anode for an all solid-state secondary battery and an all solid-state secondary battery.

2. Description of the Related Art

Lithium metal is an anode active material that has the highest energy density from among all anode active materials. Thus, commercialization of a lithium secondary battery including an anode formed of lithium metal has long been demanded.

Lithium-ion secondary batteries include a carbon anode, a cathode including a lithium-containing layered oxide, and an electrolyte including a non-aqueous liquid have been widely commercialized. When lithium metal is used to form an anode of a non-aqueous electrolyte secondary battery, precipitation and dissolution of the lithium metal occurs repeatedly during charging and discharging of the battery. A dendrite is generated through this repeated precipitation and dissolution process, and this dendrite may cause a short circuit from the anode to the cathode. This may result in insufficient stability and lifetime of the non-aqueous electrolyte secondary battery.

In addition, lithium precipitated during charging of the non-aqueous electrolyte secondary battery reacts with the organic non-aqueous electrolyte and forms a thin film that undergoes reductive cleavage on the lithium metal anode. This reaction lowers the charging and discharging efficiency of the non-aqueous electrolyte secondary battery. That is, to accommodate the lithium metal that is consumed during charging and discharging, a compensating amount of lithium metal has to be added during the manufacture of a non-aqueous electrolyte secondary battery. Accordingly, the energy density of the non-aqueous electrolyte secondary battery is reduced, making commercialization of such non-aqueous electrolyte secondary batteries more difficult.

There remains a need for an improved anode for an all solid-state secondary battery and an all solid-state secondary battery.

SUMMARY

As previously described, when lithium is used to form an anode of an all solid-state secondary battery, the problems generated in a non-aqueous electrolyte secondary battery do not occur. However, in an all solid-state secondary battery having a battery structure in which lithium is only used as a cathode active material, not an anode active material, lithium precipitates in a contact portion between an anode collector and a solid electrolyte. In addition, an overvoltage is high when the lithium precipitates on the anode collector, and the overvoltage becomes low when the lithium precipitates and grows on the precipitated lithium, and thus, local, e.g., localized, coarsening of the lithium is generated. In addition, the anode collector is formed of a metal that does not form an alloy with lithium, such as nickel (Ni). In addition, the precipitated lithium does not grow substantially in a surface direction of the anode collector, but grows in a thickness direction of the all solid-state secondary battery. The lithium dissolves during discharging as lithium ions, but if a current density is high in this process, conduction between the lithium and the solid electrolyte is cut off so that the lithium may be isolated. This lithium is referred to as dead lithium because it is not usable during charging or discharging. Accordingly, the capacity of the all solid-state secondary battery rapidly decreases due to repeated charging and discharging. That is, when an all solid-state secondary battery has a battery structure in which no lithium is included in an anode and lithium is only used as a cathode active material, the cycle characteristics of the all solid-state secondary battery deteriorate considerably.

Accordingly, there is a need for a novel and improved anode for an all solid-state secondary battery, whereby the cycle characteristics of the all solid-state secondary battery having a structure in which lithium is only used as a cathode active material may be improved and an all solid-state secondary battery including the novel and improved anode.

Additional aspects will be set forth in part in the description which follows and, in part, will be apparent from the description, or may be learned by practice of the presented embodiments.

According to an aspect of an embodiment, an anode for an all solid-state secondary battery includes: an anode collector; and a lithium distribution layer disposed on the anode collector, wherein the lithium distribution layer includes a metal capable of forming alloy with lithium.

According to this aspect, a lithium distribution layer having the previously-described characteristics is disposed, e.g., formed, on the anode collector. Accordingly, lithium may be approximately uniformly precipitated from a surface of the lithium distribution layer through an alloy layer which may be diffused faster than self-diffusing lithium. In addition, lithium may be ionized, e.g., lithium-ionized, during discharging and may be dissolved. In this process, a thickness of a lithium layer may be uniformly reduced, thus allowing a contact between the lithium layer and a solid electrolyte. Accordingly, dead lithium may be hardly generated. Thus, despite repeated charging and discharging, the capacity of the all solid-state secondary battery may be maintained, that is, the cycle characteristics of the all solid-state secondary battery may be improved.

Stated otherwise, as the lithium may be generated approximately uniformly and then dissolved on a surface of the lithium distribution layer during charging and discharging, dead lithium may be hardly generated. Thus, despite repeated charging and discharging, the capacity of the all solid-state secondary battery may be maintained, that is, the cycle characteristics of the all solid-state secondary battery may be improved.

The lithium distribution layer may include zinc, germanium, tin, antimony, platinum, gold, bismuth, an alloy thereof, or a combination thereof.

According to this aspect, as the lithium may be approximately uniformly generated and then dissolved on a surface of the lithium distribution layer during charging and discharging, dead lithium may be hardly generated. Thus, despite repeated charging and discharging, the capacity of the all solid-state secondary battery may be maintained, that is, the cycle characteristics of the all solid-state secondary battery may be improved.

The lithium distribution layer may have a thickness in a range of about 1 nanometer (nm) to less than about 100 nanometers.

According to an aspect of an embodiment, an all solid-state secondary battery includes the anode for an all solid-state secondary battery.

According to an embodiment, provided is a method of charging an all solid-state secondary battery including a cathode layer, a solid electrolyte layer on the cathode layer, and an anode layer on the solid electrolyte layer, the anode layer including an anode collector, and a lithium distribution layer disposed on the anode collector, wherein the lithium distribution layer includes a metal capable of forming an alloy with lithium, the method including applying a voltage between the cathode layer and the anode layer to dispose lithium on the lithium distribution layer and form a lithium alloy including the metal capable of forming an alloy with lithium.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
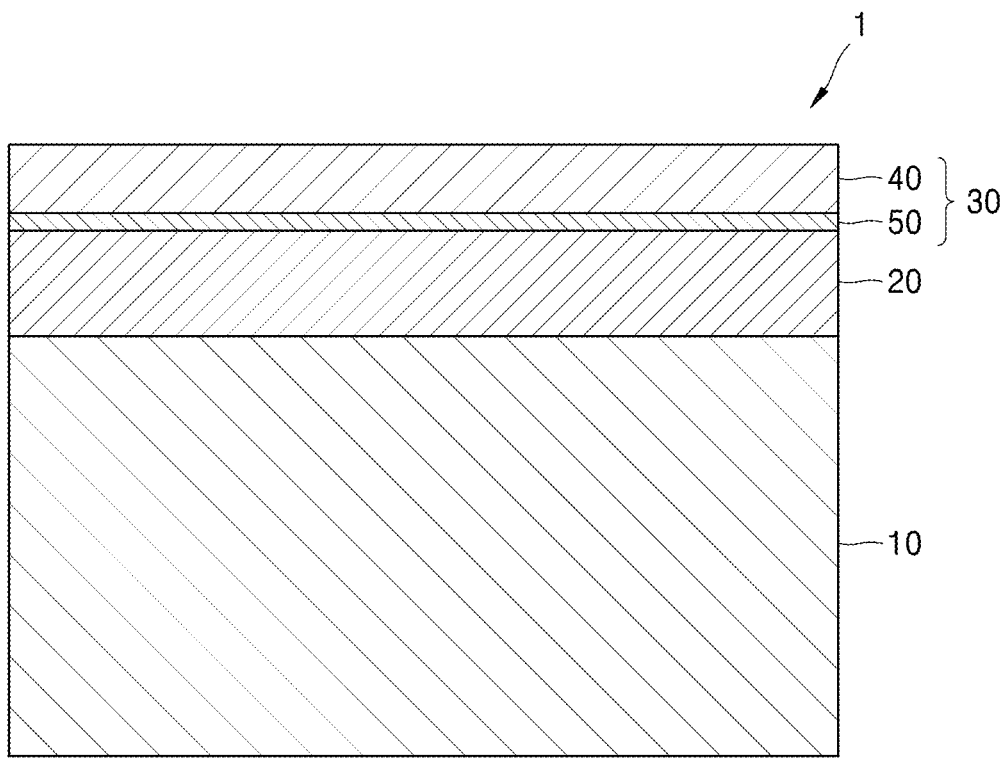
FIG. 1 is a schematic cross-sectional view of an embodiment of a layer structure of an all solid-state secondary battery.

Reference will now be made in detail to embodiments, examples of which are illustrated in the accompanying drawings. In the present specification and drawings, like reference numerals refer to like elements having substantially same functional structures to avoid repeated description. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

An all solid-state secondary battery may include a sulfide solid electrolyte, which is an inorganic solid electrolyte, instead of a non-aqueous electrolyte. Due to use of the inorganic sulfide solid electrolyte, formation of thin films that undergo reductive cleavage is not generated. Thus, even when charging and discharging are repeated, consumption of lithium ions due to these reactions is not generated. This increases the efficiency of charging and discharging of the all solid-state secondary battery, thus allowing a remarkable reduction of the amount of lithium to be loaded in an anode at the initial stage. In other words, a battery structure that only uses lithium as a cathode active material may be realized, and thus, the energy density of the battery may significantly increase.

1. Structure of All Solid-State Secondary Battery

First, a structure of an all solid-state secondary battery 1 according to an embodiment will be described with reference to FIG. 1. The all solid-state secondary battery 1 is a secondary battery in which a solid electrolyte is used as an electrolyte. In addition, the all solid-state secondary battery 1 is an all solid-state lithium ion secondary battery in which lithium ions move between a cathode layer 10 and an anode layer 30.

As illustrated in FIG. 1, the all solid-state secondary battery 1 may include the cathode layer 10, a solid electrolyte layer 20, and the anode layer 30.

1-1. Cathode Layer

The cathode layer 10 may include a cathode active material and a solid electrolyte. The cathode layer 10 may further include a conductive agent to supplement electron conductivity. In addition, the solid electrolyte in the cathode layer 10 may be homogenous or heterogeneous. The solid electrolyte will be described in more detail in the section regarding the solid electrolyte layer 20.

Any suitable cathode active material that is capable of reversibly occluding and releasing lithium ions may be used as the cathode active material.

For example, the cathode active material may comprise a lithium compound such as a lithium metal oxide, a lithium metal phosphate phosphate, or a lithium metal sulfide, such as lithium cobalt oxide ("LCO"), lithium nickel oxide, lithium nickel cobaltite, lithium nickel cobalt aluminate ("NCA"), lithium nickel cobalt manganese oxide ("NCM"), lithium manganese oxide, lithium iron phosphate, nickel sulfide, copper sulfide, iron oxide, or vanadium oxide, or sulfur. These cathode active materials may be used alone or in a combination thereof.

The cathode active material may include a lithium transition metal oxide having a layered rock salt type structure. In this case, the term "layered" refers to a crystal structure in which the atoms are arranged in layers or sheets. The term "rock salt type structure" refers to a sodium chloride type structure that is one type of a crystal structure, specifically, a structure in which face-centered cubic lattices formed by each of positive ions and negative ions are arranged apart from each other by ½ of an edge of a unit lattice.

Examples of the lithium transition metal oxide having the layered rock salt type structure include lithium ternary transition metal oxides such as $LiNi_xCo_yAl_zO_2$ ("NCA") or $LiNi_xCo_yMn_zO_2$ ("NCM") (where $0<x<1$, $0<y<1$, $0<z<1$, and $x+y+z=1$).

When the cathode active material includes a lithium ternary transition metal oxide having the layered rock salt type structure, an energy density and thermal stability of the all solid-state secondary battery 1 may be improved.

The cathode active material may be covered with a coating layer. Here, the coating layer of an embodiment may be any suitable coating layer of a cathode active material of an all solid-state secondary battery. For example, the coating layer may be $Li_2O$—$ZrO_2$.

When a cathode active material is formed of a lithium ternary transition metal oxide such as NCA or NCM, and nickel (Ni) is included as the cathode active material, the capacity density of the all solid-state secondary battery 1 may be increased, and elution of metal from the cathode active material in a charged state may be reduced. Accordingly, the all solid-state secondary battery 1 according to an embodiment may have improved long-term reliability and improved cycle characteristics in a charged state.

The cathode active material may have, for example, a particle shape such as a spherical shape or an elliptical spherical shape. In addition, the particle size of the cathode active material is not particularly limited, and may be within a range applicable to a cathode active material of a comparative all solid-state secondary battery. The content of the cathode active material in the cathode layer 10 is also not particularly limited, and may be similar to that of a cathode layer of a comparative all solid-state secondary battery.

In addition to the cathode active material and the solid electrolyte previously described, for example, a conductive agent and a binder may be appropriately mixed in the cathode layer 10.

Examples of the conductive agent that may be mixed in the cathode layer 10 include graphite, carbon black, acetylene black, ketjen black, carbon fiber, and metal powder.

Examples of the binder that may be mixed in the cathode layer 10 include polytetrafluoroethylene, polyvinylidene fluoride, and polyethylene.

1-2. Solid Electrolyte Layer

The solid electrolyte layer 20 is disposed, e.g., formed, between the cathode layer 10 and the anode layer 30 and includes a solid electrolyte.

The solid electrolyte comprises, for example, a sulfide-based solid electrolyte material. Examples of the sulfide-based solid electrolyte material include $Li_2S$—$P_2S_5$, $Li_2S$—$P_2S_5$—LiX (wherein X is a halogen element such as I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (wherein m and n are integers, Z is Ge, Zn, or Ga), $Li_2S$—$GeS_2$, $Li_2S$—$SiS_2$—$Li_3PO_4$, $Li_2S$—$SiS_2$—$Li_pMO_q$ (p and q are integers, and M is P, Si, Ge, or the like). The sulfide-based solid electrolyte material may be formed by treating a starting material (for example, $Li_2S$ or $P_2S_5$) using a quenching method, a mechanical milling method, or the like. Further, annealing may be further performed after the previously described treatment.

As the solid electrolyte, the previously-described sulfide solid electrolyte materials including at least sulfur (S), phosphorus (P), and lithium (Li) as constituents may be used, and for example, a sulfide solid electrolyte material including $Li_2S$—$P_2S_5$ may be used.

When a material containing $Li_2S$—$P_2S_5$ is used as the sulfide-based solid electrolyte material for forming the solid electrolyte, a molar ratio of $Li_2S$ and $P_2S_5$ may be selected in a range of, for example, $Li_2S:P_2S_5=50:50$ to $90:10$.

Examples of the shape of the solid electrolyte include a particle shape such as a spherical shape or an elliptic spherical shape. The particle diameter of the solid electrolyte is not particularly limited, and may be within a range applicable to a solid electrolyte of a comparative all solid-state secondary battery.

1-3. Anode Layer

As illustrated in FIG. 1, the anode layer 30 includes an anode collector 40 and a lithium distribution layer 50. The anode collector 40 can be a planar material (e.g., a foil such as a metal foil) formed of a conductive material. Examples of materials used to form the anode collector 40 may be stainless steel ("SUS"), titanium (Ti), or nickel (Ni).

The lithium distribution layer 50 is disposed on a surface of the anode collector 40, for example, a surface of the anode collector 40 facing the solid electrolyte. The lithium distribution layer may comprise a metal which alloys with lithium. A diffusion rate of lithium in the lithium distribution layer may be greater than a diffusion rate of lithium in lithium metal. In an embodiment, the lithium distribution layer comprises a metal which forms a lithium alloy, and a diffusion rate of lithium in the lithium alloy is about 1 to about 10, or about 2 to about 8 times greater than a diffusion rate of lithium in lithium metal.

While not wanting to be bound by theory, it is understood that during charge, lithium metal is precipitated on the metal of the lithium distribution layer 50 to form a lithium alloy. In an embodiment, because the anode collector 40 is coated with the lithium distribution layer 50, lithium metal is precipitated on the lithium distribution layer 50 during charge. Also, because the lithium diffusion rate of the lithium distribution layer is greater than a lithium diffusion rate of lithium in lithium metal, lithium is quickly diffused in the lithium distribution layer, and accordingly, the lithium metal is precipitated with improved uniformity on the surface of the lithium distribution layer 50.

The lithium distribution layer 50 may be formed of a different material from that of the anode collector 40. The lithium distribution layer 50 comprises a metal that forms an alloy with lithium. Examples of the metal include zinc, germanium, tin, antimony, platinum, gold, bismuth, and an alloy thereof, or a combination thereof. In an embodiment the lithium distribution layer 50 comprises one or two of these materials. Accordingly, lithium metal is precipitated over a broad area of the surface of the lithium distribution layer 50. That is, the lithium metal is hardly, e.g., limitedly, grown in a thickness direction of the all solid-state secondary battery 1, and is uniformly precipitated on a broad area of the surface of the lithium distribution layer 50. As a result, a lithium metal layer is continuously formed in a surface direction of the lithium distribution layer 50, and thus, dead lithium, i.e., lithium which is no longer electrochemically active, e.g., electrically disconnected from the anode layer, is hardly formed during discharge.

1-4. Behavior of Anode Layer During Charge and Discharge

Figure 2:
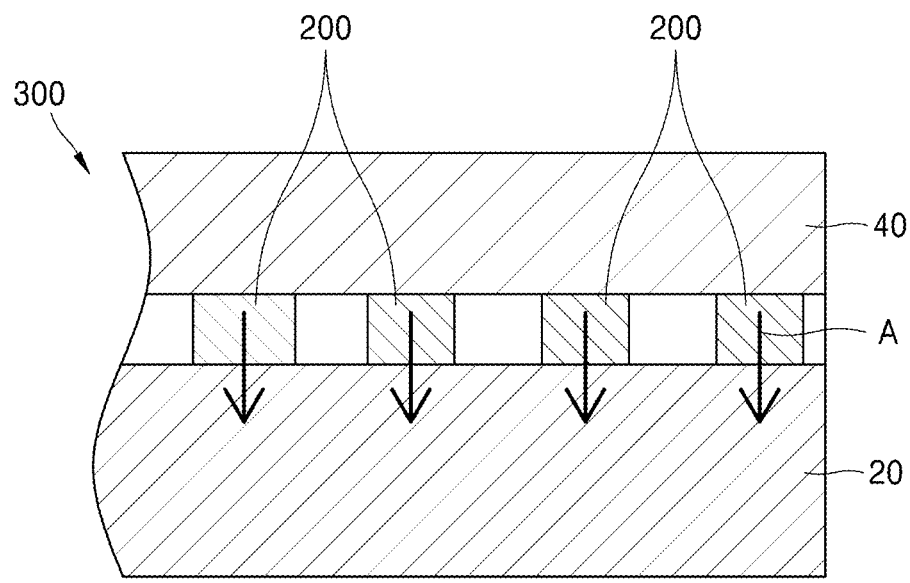
FIG. 2 is a schematic cross-sectional view of an embodiment of a behavior of an embodiment of an anode without a lithium distribution layer when charging an all solid-state secondary battery.

To more clearly illustrate the effect according to an embodiment, the behavior of the anode layer 30 during charge and discharge will be further described. First, for comparison, the behavior of an anode layer 300 that does not include the lithium distribution layer 50, during charge and discharge, will be described with reference to FIGS. 2 and 3. First, during charge, lithium metal 200 is precipitated only in a contact portion with respect to, e.g., between, the anode collector 40 and the solid electrolyte, e.g., a portion of the anode collector 40 contacting the solid electrolyte 20, as illustrated in FIG. 2. In addition, even in a contact state, e.g., with respect to the portion of the anode collector 40 contacting the solid electrolyte 20, lithium metal is precipitated just locally. While not wanting to be bound by theory, it is understood that the local precipitation of lithium is due to a high overvoltage of precipitation. In addition, the lithium metal 200 that is precipitated is primary grown in a thickness direction of the all solid-state secondary battery and less grown in a surface direction of the anode collector 40. Arrow A denotes a growth direction of the lithium metal 200. Accordingly, the lithium metal 200 that is grown significantly in the thickness direction of the all solid-state secondary battery is locally formed on the anode collector 40.

Figure 3:
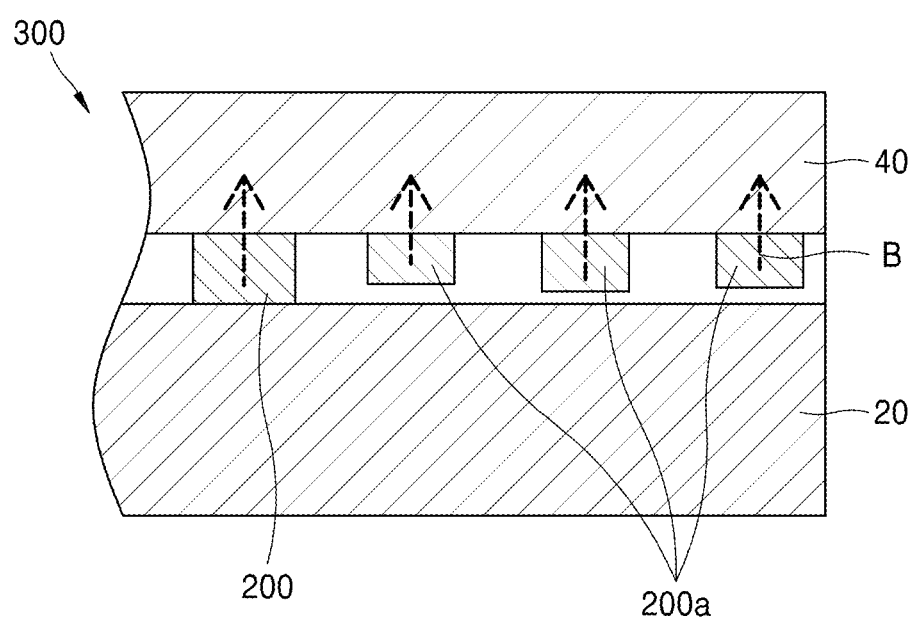
FIG. 3 is a schematic cross-sectional view of an embodiment of a behavior of an embodiment of an anode without a lithium distribution layer when discharging an all solid-state secondary battery.

Also, during discharge, the lithium metal 200 is slowly dissolved to form lithium ions and is reduced in size in a direction of arrow B as illustrated in FIG. 3. In this process, conduction between a portion of the lithium metal 200 and the solid electrolyte may be interrupted. The lithium metal 200 in which conduction is interrupted is not usable in charging or discharging, and thus, it is referred to as dead lithium. In the example embodiment of FIG. 3, conduction between dead lithium metal 200a and the solid electrolyte is interrupted. In addition, as the lithium metal 200 is locally formed on the anode collector 40, dead lithium is easily formed. This in turn rapidly decreases the capacity of the all solid-state secondary battery with repeated charging and discharging.

Figure 4:
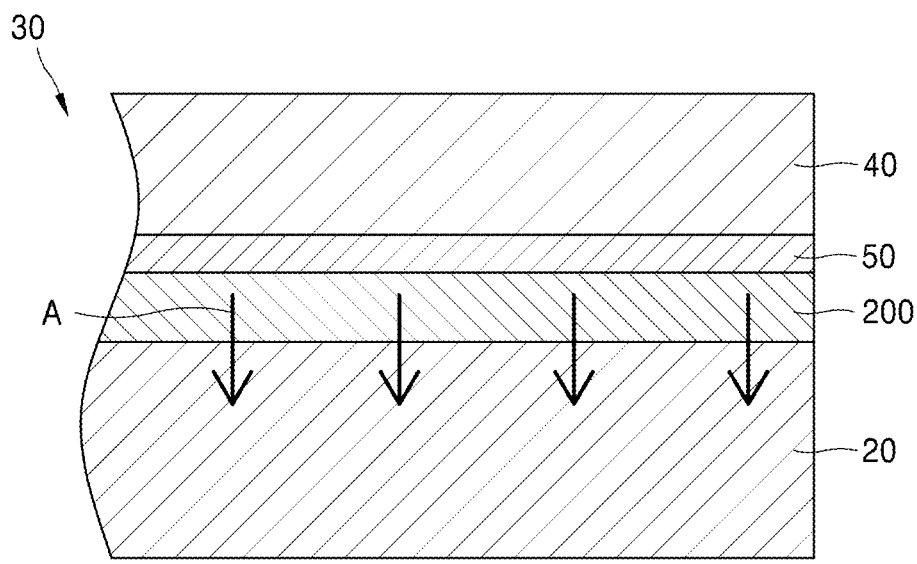
FIG. 4 is a schematic cross-sectional view of an embodiment of a behavior of an embodiment of an anode including a lithium distribution layer when charging an all solid-state secondary battery.

Next, the behavior of the anode layer 30 according to an embodiment during charge and discharge will be further described with reference to FIGS. 4 and 5. First, as illustrated in FIG. 4, during charge, lithium ions are disposed on and form alloy with, e.g., enter, the lithium distribution layer 50 from a contact portion between the lithium distribution layer 50 and a solid electrolyte and form an alloy together with the metal constituting the lithium distribution layer 50. Because the diffusion coefficient of lithium in the lithium alloy is greater than a diffusion coefficient of lithium in lithium metal, lithium diffuses relatively quickly in the alloy, and alloying proceeds in a surface direction of the lithium distribution layer 50. That is, the lithium distribution layer 50 is changed into a lithium alloy layer. Accordingly, the lithium metal 200 may be precipitated from the entire area where the lithium metal 200 has become a lithium alloy layer. As a result, the lithium metal 200 is more uniformly precipitated from the surface of the lithium distribution layer 50. That is, a layer formed of the lithium metal 200, that is, a lithium metal layer, is continuously formed on the surface of the lithium distribution layer 50 in a surface direction. Arrow A denotes a direction in which the lithium metal 200 is precipitated.

Figure 5:
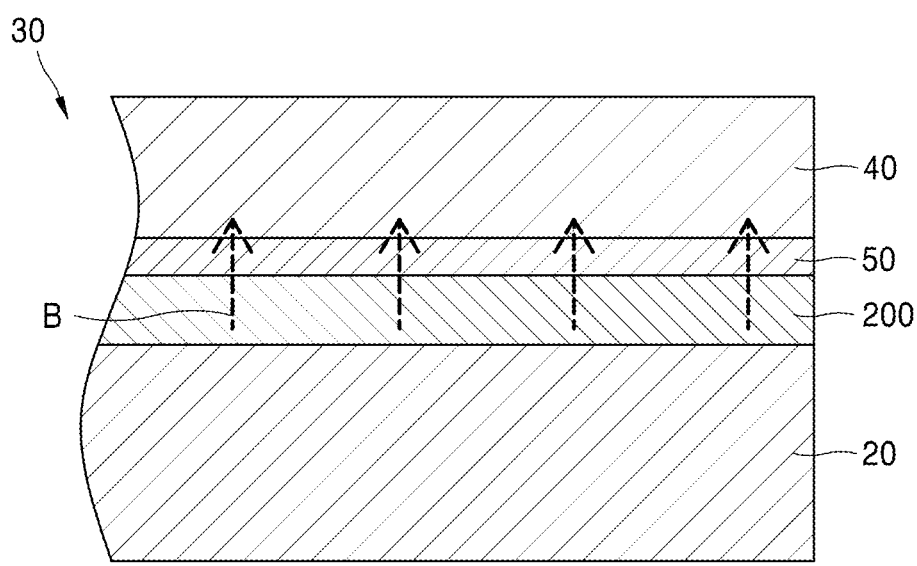
FIG. 5 is a schematic cross-sectional view of an embodiment of a behavior of an embodiment of an anode including the lithium distribution layer when discharging an all solid-state secondary battery.

In addition, during discharge, the lithium metal 200 is ionized and converted from lithium metal to lithium ions, and the lithium metal 200 is reduced in size in a direction of arrow B as illustrated in FIG. 5. In this process, the lithium metal 200 is converted into a continuous lithium layer in a surface direction, and has a thickness decreasing approximately uniformly, and thus may maintain contact with the lithium metal 200 and the solid electrolyte. Accordingly, dead lithium is not easily formed or avoided. Thus, despite repeated charging and discharging, the capacity of the all solid-state secondary battery may be maintained, and cycle characteristics of the all solid-state secondary battery may be improved.

A thickness of the lithium distribution layer 50 is not particularly limited, but if the thickness is too small, lithium metal may not be easily precipitated. If the lithium distribution layer 50 is too thick, the lithium distribution layer 50 itself may act as an anode active material. In this case, less lithium metal is precipitated, which, while not wanting to be bound by theory, it is understood to make it difficult to fully use the high energy density of the lithium metal. In addition, due to large volume expansion of the lithium metal during alloying, division of electrodes may be caused, which reduces the efficiency. Thus, the lithium distribution layer 50 may have a thickness in a range of from about 1 nm o to less than about 100 nm, about 2 nm to about 90 nm, or about 4 nm to about 80 nm. An upper limit of the thickness of the lithium distribution layer 50 may be 95 nm, for example, 90 nm or 50 nm.

As previously described, the lithium distribution layer 50 according to an embodiment extends a precipitation area of the lithium metal 200. In an embodiment the lithium distribution layer 50 is not used as an anode active material layer.

The structure of the all solid-state secondary battery 1 according to an embodiment is previously described in detail.

2. Method of Manufacturing Lithium Ion Secondary Battery

Next, the method of manufacturing the all solid-state secondary battery 1 according to an embodiment will be further described. The all solid-state secondary battery 1 may be manufactured by individually manufacturing the cathode layer 10, the anode layer 30, and the solid electrolyte layer 20, and then stacking these layers.

Manufacture of Cathode Layer

A cathode active material may be purchased commercially, or may be manufactured by using any suitable method.

Next, a slurry or paste is formed by mixing the cathode active material, a solid electrolyte, which may be formed using a method described below, and various additives and adding a nonpolar solvent thereto. In addition, by coating a cathode collector with the slurry or paste and then drying and rolling the same, the cathode layer 10 may be obtained.

Examples of the material constituting the cathode collector may be aluminum and stainless steel. The cathode layer 10 may also be manufactured without using the cathode collector, by forming a mixture of the cathode active material and various additives into pellets and performing compaction molding thereon.

Manufacture of Anode Layer

The anode layer 30 is manufactured by coating the anode collector 40 with the lithium distribution layer 50. The method used to coat the anode collector 40 with the lithium distribution layer 50 is not particularly limited, and may be, for example, an electroless plating method, a sputtering method, or a vacuum deposition method. As is further described above, as no anode active material has to be prepared in an embodiment, the anode layer 30 may be easily manufactured. In addition, in an embodiment no lithium metal is used during manufacture, and thus, the costs associated with manufacturing facilities for controlling dew points or for safety measures may be significantly saved.

Manufacture of Solid Electrolyte Layer

The solid electrolyte layer 20 may be manufactured using a solid electrolyte formed of a sulfide-based solid electrolyte material.

First, a starting material is treated using a dissolution quenching method or a mechanical milling method.

For example, when using a dissolution quenching method, predetermined amounts of starting materials (for example, $Li_2S$ or $P_2S_5$) are mixed and formed in a pellet form, and then reacted under vacuum at a predetermined reaction temperature and quenched to obtain a sulfide-based solid electrolyte material. The reaction temperature of the mixture of $Li_2S$ and $P_2S_5$ is in a range of, for example, from about 400° C. to about 1,000° C. or from about 800° C. to about 900° C. The reaction time is in a range of, for example, from about 0.1 hour to about 12 hours or from about 1 hour to about 12 hours. The quenching temperature of the reactant is, for example, 10° C. or less or 0° C. or less. The quenching rate is in a range of, for example, from about 1° C./second (sec) to about 10,000° C./sec or from about 1° C./sec to about 1,000° C./sec.

When using a mechanical milling method, a sulfide-based solid electrolyte material may be prepared by stirring and reacting a starting material (for example $Li_2S$ or $P_2S_5$) using a ball mill or the like. The stirring speed and stirring time in the mechanical milling method are not particularly limited. However, the greater the stirring speed, the faster the production rate of the sulfide-based solid electrolyte material, and the longer the stirring time, the greater a conversion rate of starting materials into a sulfide-based solid electrolyte.

Next, the mixed starting materials obtained using the dissolution quenching method or the mechanical milling method are subjected to heat treatment at a predetermined temperature and then pulverized to thereby obtain a particulate solid electrolyte.

Next, the solid electrolyte obtained using the previously described method may be deposited by using a suitable deposition method such as an aerosol deposition method, a cold spray method, or a sputtering method so as to form the solid electrolyte layer 20. Further, the solid electrolyte layer 20 may be formed by pressing a solid electrolyte particle simple substance. The solid electrolyte layer 20 may be formed by mixing a solid electrolyte, a solvent, and a binder, and then applying, drying, and pressurizing the mixture.

Manufacture of Lithium Ion Secondary Battery

The cathode layer 10, the solid electrolyte layer 20, and the anode layer 30 formed by using the previously described method may be stacked such that the solid electrolyte layer 20 is interposed between the cathode layer 10 and the anode layer 30, and then pressurized to thereby manufacture the all solid-state secondary battery 1 according to an embodiment.

EXAMPLE

1. Evaluation of Cycle Characteristics

First, a test was conducted as follows to evaluate the cycle characteristics of the all solid-state secondary battery 1 according to an embodiment.

1-1. Example 1

In Example 1, first, the all solid-state secondary battery 1 was manufactured in the following process.

1-1-1. Manufacture of Anode Layer

A nickel (Ni) foil was prepared as an anode collector 40, and tin (Sn) was plated on a surface of the anode collector 40 to a thickness of 1 nanometer (nm) by electroless plating. Thus, a lithium distribution layer 50 that is formed of tin and has a thickness of 1 nm was formed on the anode collector 40.

1-1-2. Manufacture of All Solid-State Secondary Battery

The anode layer 30 prepared as previously described was punched to provide a disk having a diameter of ϕ13 millimeters (mm) and set in a cell container. 70 milligrams (mg) of $Li_2S$—$P_2S_5$ (molar ratio 80:20) that was subjected to mechanical milling ("MM" treatment) was stacked as solid electrolyte particles, and a surface thereof was lightly trimmed using a molding machine. Accordingly, the solid electrolyte layer 20 was formed on the cathode layer 30. Subsequently, a mixture obtained by mixing $LiNi_{0.5}Mn_{0.3}Ni0.2O_2$ as a cathode active material and solid electrolyte particles and a vapor grown carbon fiber ("VGCF"), which is a conductive agent, respectively at 60 weight percent (wt %), 35 wt %, and 5 wt % was stacked on a solid electrolyte layer 20 to form a cathode layer 10. Next, the stacked structure was pressed at a pressure of 3 tons per square centimeter ($t/cm^2$) to prepare a test cell according to Example 1.

1-1-3. Evaluation of Cycle Characteristics

Figure 6:
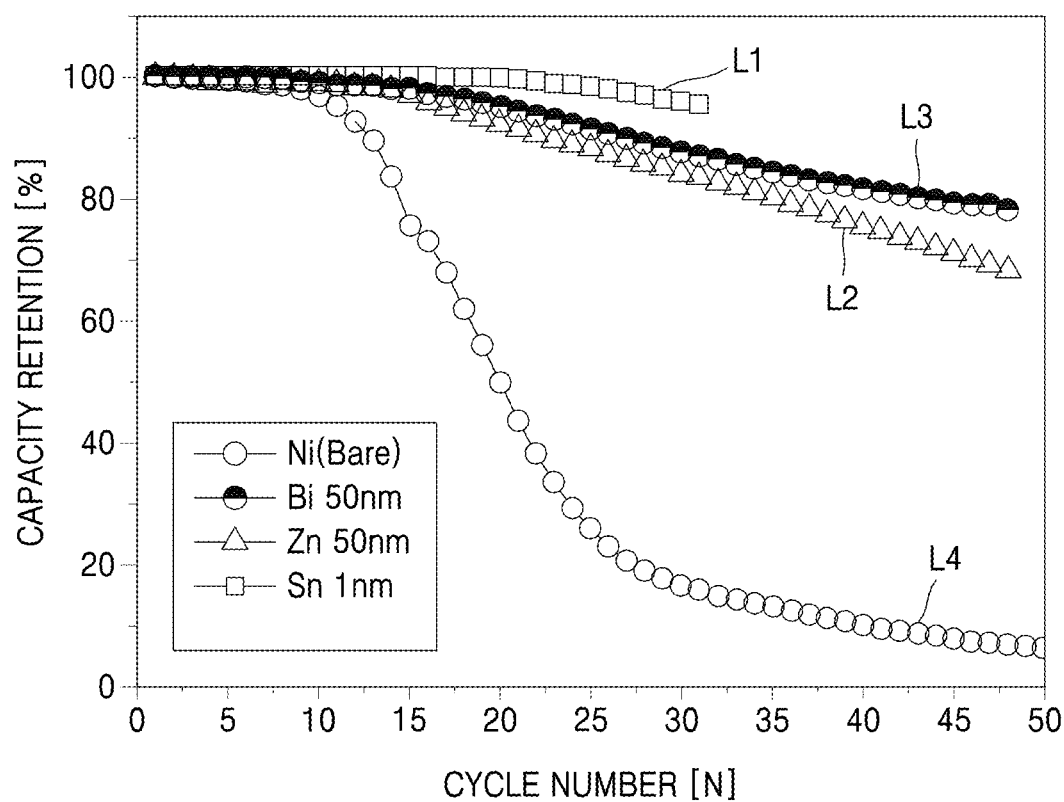
FIG. 6 is a graph showing capacity retention (%) versus cycle number (N) of all solid-state secondary batteries according to an example embodiment and a comparative example.

The test cell was put in a temperature controlled chamber at a temperature of 25° C., and charging and discharging were conducted at 0.1 C constant current charging, 0.5 C constant current discharging, and in a voltage range of 4.0 volts (V) −3.0 V using a TOSCAT-3100 charging/discharging testing device, available from TOYO SYSTEM Corporation, to evaluate cycle characteristics of the test cell. The result is shown in FIG. 6. Line L1 of FIG. 6 shows cycle characteristics of the test cell of Example 1.

1-2. Example 2

In Example 2, the same treatment as in Example 1 was performed except that the anode layer 30 was formed in a following process. The result is shown in FIG. 6. Line L2 of FIG. 6 shows cycle characteristics of the test cell of Example 2.

1-2-1. Manufacture of Anode Layer

A Ni foil was prepared as the anode collector 40, and zinc (Zn) was coated on a surface of the anode collector 40 to a thickness of 50 nm by sputtering. Accordingly, a lithium distribution layer 50 that is formed of Zn and has a thickness of 50 nm was formed on the anode collector 40.

1-3. Example 3

In Example 3, the same treatment as in Example 1 was performed except that the anode layer 30 was formed in a following process. The result is shown in FIG. 6. Line L3 of FIG. 6 shows cycle characteristics of the test cell of Example 3.

1-3-1. Manufacture of Anode Layer

A Ni foil was prepared as the anode collector 40, and bismuth (Bi) was coated on a surface of the anode collector 40 to a thickness of 50 nm by sputtering. Accordingly, a lithium distribution layer 50 that is formed of Bi and has a thickness of 50 nm was formed on the anode collector 40.

1-4. Comparative Example 1

In Comparative example 1, the same treatment as in Example 1 was performed except that the Ni foil used in Example 1 was used as the anode layer 30. The result is shown in FIG. 6. Line L4 of FIG. 6 shows cycle characteristics of the test cell of Comparative example 1.

1-5. Evaluation of Cycle Characteristics

As apparent from FIG. 6, the cycle characteristics of Examples 1 through 3 were relatively satisfactory, whereas in Comparative example 1, the cycle characteristics were rapidly degraded from an early stage. Thus, in Comparative example 1, it may be regarded that a large amount of dead lithium was created according to charging and discharging. On the other hand, in Examples 1 through 3, as a lithium metal layer is formed on a surface of the lithium distribution layer 50 approximately uniformly and then dissolved, it may be regarded that dead lithium was not generated or minimized.

2. Detection of Precipitation Form

Figure 7:
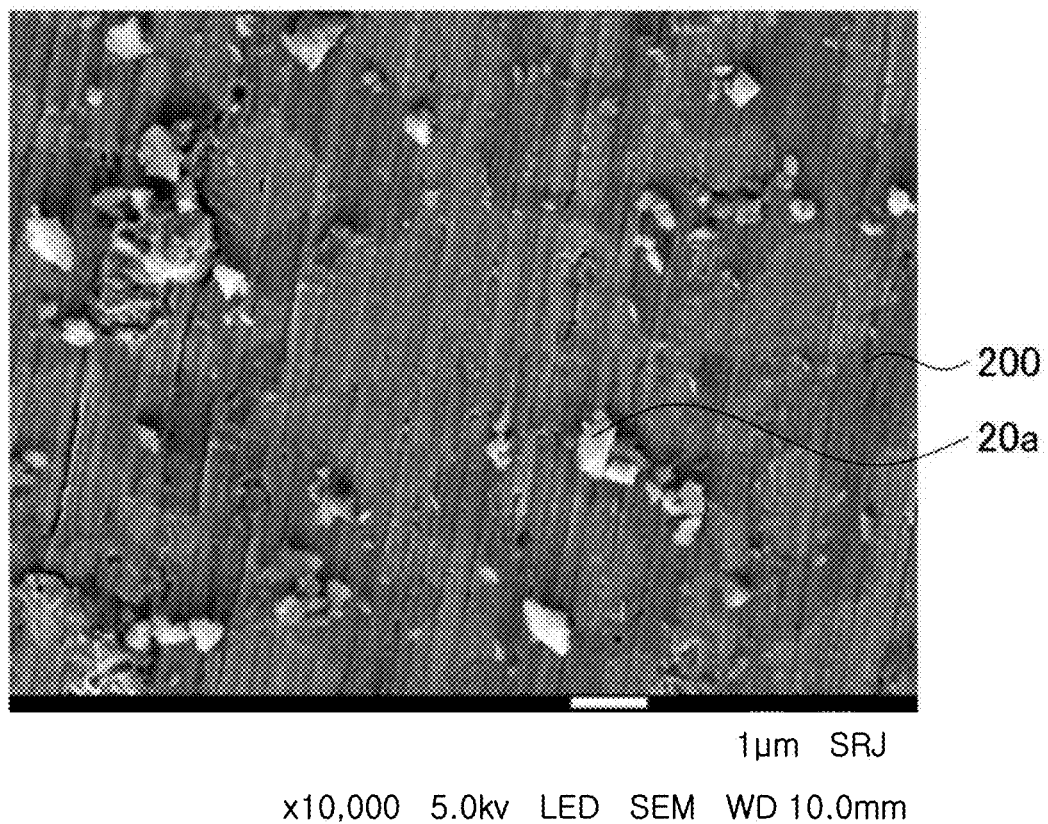
FIG. 7 is a scanning electron microscope ("SEM") image of a surface state of an anode of an all solid-state secondary battery according to a comparative example.
Figure 8:
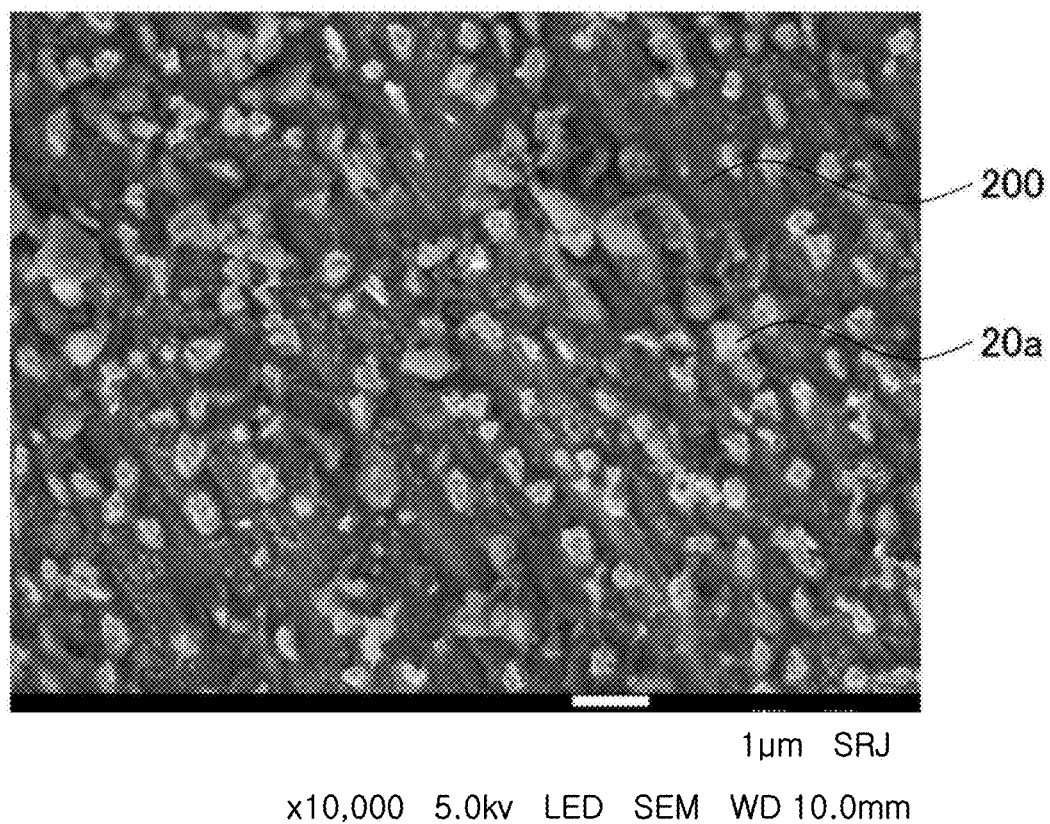
FIG. 8 is a SEM image of an embodiment of a surface state of an anode of an all solid-state secondary battery.

In order to see the form of precipitation of the lithium metal 200 involved in charging and discharging, the test cells were disassembled after the evaluation test of the cycle characteristics of Example 3 and Comparative example 1 was completed. Then, the surface of the anode layer 30 was observed using a scanning electron microscope ("SEM"). FIG. 7 is a SEM image of Comparative example 1. FIG. 8 is a SEM image of Example 3. As shown in FIG. 7, the lithium metal 200 is precipitated locally on the surface of the anode collector 40, and a solid electrolyte 20a is adhered only to a portion of the surface of the anode collector 40. In other words, the lithium metal 200 is precipitated locally. On the other hand, in Example 3, the lithium metal 200 is precipitated over substantially the entire surface of the anode collector 40, and the solid electrolyte 20a is adhered dispersively over the entire surface of the anode collector 40, e.g., the solid electrolyte 20a is dispersed over the entire surface of the anode collector 40 and adhered thereto.

3. Evaluation of Electric Capacity of Lithium distribution Layer

As previously described, the lithium distribution layer 50 is used to extend the precipitation area of the lithium metal 200, and is distinct from the anode active material layer. That is, in an embodiment, during charge and discharge, lithium metal is precipitated from the anode layer 30 and dissolved. Accordingly, an electric capacity of the lithium distribution layer 50 is significantly less than that of the all solid-state secondary battery 1 as a whole. To check this, a test was conducted as follows.

That is, in the present test, a plurality of Ni foils were prepared as the anode collector 40, and surfaces of the anode collector 40 were respectively coated with tin, zinc, bismuth, germanium, antimony, and gold to a thickness of 1 nm. Tin and gold were coated using an electroless plating method, and germanium, antimony, zinc, and bismuth were coated using a sputtering method. Accordingly, a plurality of anode layers 30 having different types of lithium distribution layers 50 were manufactured. Next, test cells were manufactured using the same method as in Example 1 based on the anode layer 30. However, as the cathode layer 10, a Li foil (thickness of 0.03 mm) having a diameter Φ 13 mm was used.

Next, each test cell was set in a temperature controlled chamber at a temperature of 25° C., and lithium was inserted into the lithium distribution layers 50 for ten minutes at a current density of 0.25 milliamperes per square centimeter (mA/cm$^2$) using Potentio/Galvano Stat 1470E available from Solatron so as to lower a potential of the test cells to a potential at which lithium metal is precipitated. Then an electric capacity of the test cell as a whole was measured. Also, an electric capacity of the lithium distribution layer 50 was measured based on a theoretical capacity of a metal type that constitutes the lithium distribution layer 50, which is approximately equal to unit mass. Then, the capacity retention (%), e.g., the electric capacity of the lithium distribution layer 50 with respect, e.g., relative, to that of the test cell as a whole, was calculated, and a result thereof is shown in Table 1.

TABLE 1

| | Electric capacity of the lithium distribution layer 50 (milliampere hours (mAh)) | Capacity of the lithium distribution layer 50 relative to the capacity of the entire test cell (%) |
| --- | --- | --- |
| Sn | 0.0009 | 0.05 |
| Zn | 0.0004 | 0.02 |
| Ge | 0.0010 | 0.06 |
| Sb | 0.0005 | 0.03 |
| Bi | 0.0004 | 0.03 |
| Au | 0.0012 | 0.07 |

According to Table 1, the electric capacity of the lithium distribution layer 50 is remarkably less than the electric capacity of the test cell as a whole, indicating that the lithium distribution layer 50 is used not as an anode active material layer but used in extending a precipitation area of the lithium metal 200. These results show that by using the lithium distribution layer 50, which is very thin, an all solid-state secondary battery having a high electric capacity may be implemented.

3. Variation in Potential Profile of Anode According to Whether Anode Active Material Layer is Present or Not As previously described, the lithium distribution layer 50 is used to extend the precipitation area of the lithium metal 200, and not used as an anode active material layer. That is, in an embodiment, during charge and discharge, lithium metal is precipitated from the anode layer 30 and dissolved. Accordingly, a potential of the anode layer 30 during discharge decreases to 0 V (vs. Li/Li$^+$) immediately after discharging is started. To check this, a test was conducted as follows.

A test cell was prepared in the same manner as in 3. Evaluation of the electric capacity of the lithium distribution layer, except that a Ni foil was used as the anode layer 30. The test cell is used to determine the behavior of the anode layer 30 according to an embodiment. In addition, two Ni foils were prepared as the anode collector 40, and tin and gold were each plated on surfaces of the anode collector 40 to a thickness of 100 nm by using an electroless plating method. The anode layer 30 was manufactured in this manner. Because the metal layer manufactured on the anode collector 40 by using this method is relatively thick, the metal layer functions as an anode active material layer. Next, a test cell was manufactured in the same manner as in 3. (Evaluation of Electric Capacity of Lithium distribution Layer), using the anode layer 30.

Figure 9:
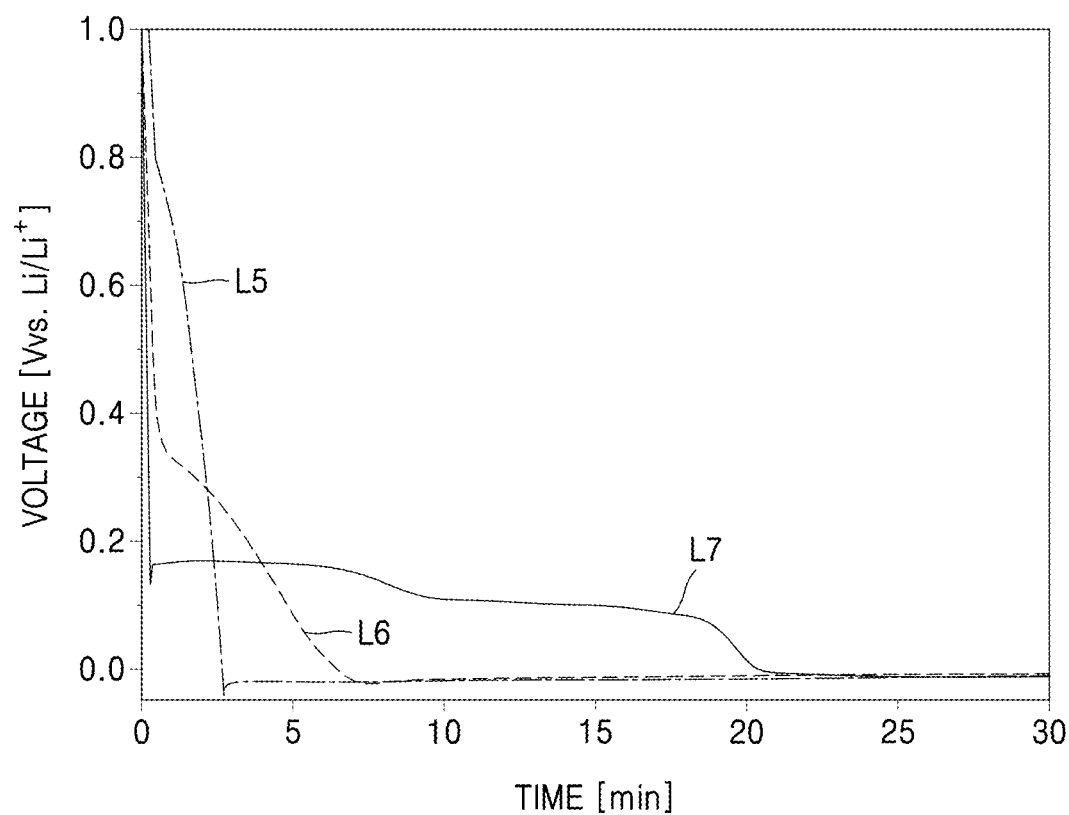
FIG. 9 is a graph of voltage (volts (V) versus $Li/Li^+$) versus time (minutes (min)) of test cells according to example embodiments and a comparative example.

Next, the test cell was set in a temperature controlled chamber at a temperature of 25° C., and lithium was inserted into the anode for 60 minutes at a current density of 0.5 mA/cm$^2$ by using Potentio/Galvano Stat 1470E available from Solatron. Then a potential profile of the anode layer 30 was measured. The result is shown in FIG. 9. Line L5 of FIG. 9 indicates a potential profile of the test cell in which a Ni foil is used as the anode layer 30. Lines L6 and L7 show potential profiles of the test cells in which tin and gold are respectively used to form an anode active material layer.

Referring to FIG. 9, in the test cell in which a Ni foil is used as the anode layer 30, the potential of the test cell decreased to 0 V (versus Li/Li+) almost right after discharging started. This indicates that lithium metal was precipitated in the anode layer 30. The test cells in which tin and gold are used to form the anode active material layer maintained a relatively high potential. This high potential corresponds to a potential of the anode active material layer. That is, tin and gold are used as an anode active material. In this respect, it was determined that the lithium distribution layer 50 was used to extend the precipitation area of the lithium 200.

Figure 10:
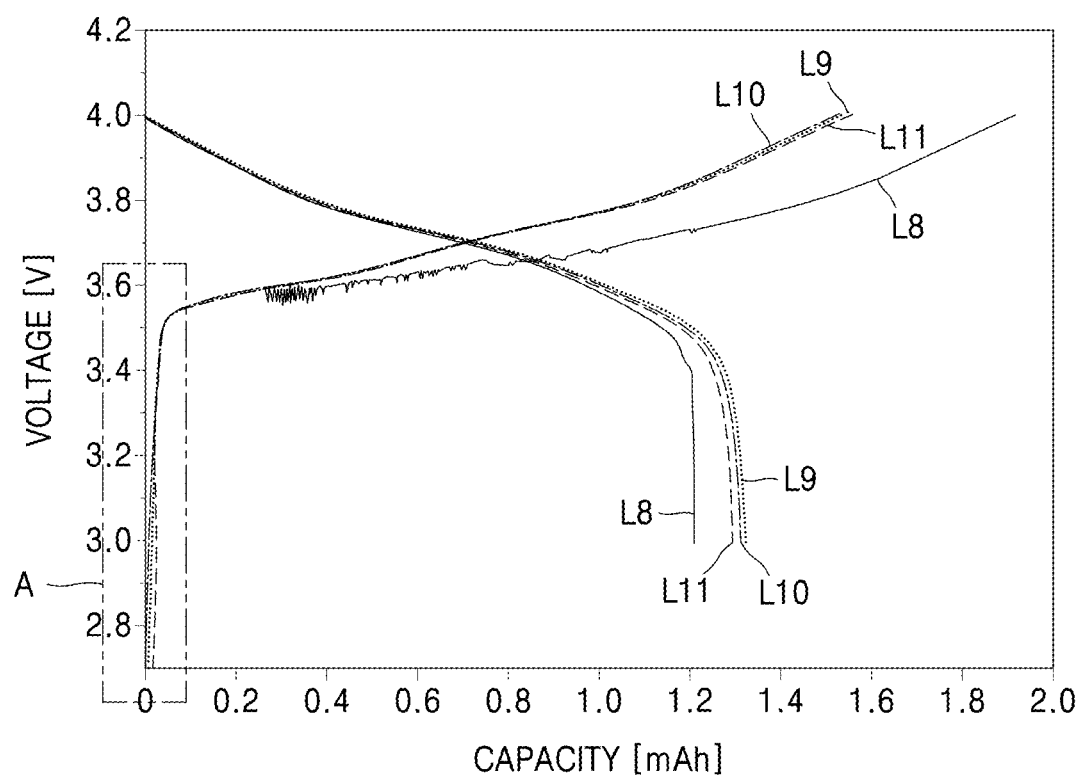
FIG. 10 is a graph of voltage (volts (V)) versus capacity ((milliampere hour (mAh)) of test cells according to example embodiments and comparative examples.

4. Charging and Discharging Profile of Test Cells According to Whether Anode Active Material Layer is Present or Not In order to determine that the lithium distribution layer 50 is not used as an anode active material layer, another test was conducted as follows. That is, a Ni foil was prepared as the anode collector 40, and a surface of the anode collector 40 was coated with gold, zinc, or bismuth to a thickness of 50 nm by using a sputtering method. Accordingly, the lithium distribution layer 50 that is formed of gold, zinc or bismuth and has a thickness of 50 nm was formed on the anode collector 40. By using the anode 30 manufactured as previously described, a test cell that is the same as that of Example 1 was manufactured. In addition, a test cell that is the same as that of Example 1 was manufactured by using the anode 30 formed of only a Ni foil for comparison. Next, the test cell was set in a temperature controlled chamber at a temperature of 25° C., and charging and discharging were conducted once at a current density of 0.05 mA/cm$^2$ and in a voltage range of 4.0 V-3.0 V by using a charging/discharging testing device TOSCAT-3100 available from TOYO SYSTEM Corporation. The charging and discharging profile of the test cell is shown in FIG. 10. Line L8 shows a charging and discharging profile of the test cell in which the anode layer 30 is formed of a Ni foil. Line L9 shows a charging and discharging profile of the test cell in which the lithium distribution layer 50 is formed of gold. Line L10 shows a charging and discharging profile of the test cell in which the lithium distribution layer 50 is formed of zinc. Line L11 shows a charging and discharging profile of the test cell in which the lithium distribution layer 50 is formed of bismuth. If the lithium distribution layer 50 functions as an anode active material layer, capacity components of different potentials would have appeared according to the metal type in the charging profile surrounded by area A, but such capacity components were hardly observed. Thus, this also indicates that the lithium distribution layer 50 is not used as an anode active material layer. In addition, in the test cell in which a Ni foil was used as the anode layer 30, even during charging, a potential increment is smaller than in other test cells. As a short circuit is being caused in the test cell in which a Ni foil was used as the anode 30, the smaller potential increment is estimated to occur due to the short circuit. That is, in the test cell in which a Ni foil was used as the anode 30, it is estimated that a large amount of lithium is precipitated, and a short circuit is slightly generated due to concentration of current.

As previously described, according to an embodiment, as the lithium layer is generated approximately uniformly and lost on, e.g., eliminated from, a surface of the lithium distribution layer during charging and discharging, dead lithium is hardly generated. Thus, despite repeated charging and discharging, the capacity of the all solid-state secondary battery may be maintained, that is, the cycle characteristics of the all solid-state secondary battery may be improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of charging an all solid-state secondary battery, the method comprising:
    providing an all solid-state battery comprising
        a cathode layer,
        a solid electrolyte layer on the cathode layer, and
        an anode layer on the solid electrolyte layer and opposite the cathode layer, the anode layer comprising an anode collector, and a lithium distribution layer disposed on the anode collector,
        wherein the lithium distribution layer comprises a metal capable of forming an alloy with lithium and is disposed between the solid electrolyte layer and the anode collector,
        wherein the anode collector comprises a different material than that of the lithium distribution layer,
        wherein a diffusion coefficient of lithium in the lithium distribution layer during charging the all solid-state secondary battery is greater than a diffusion coefficient of lithium in lithium metal;
    applying a voltage between the cathode layer and the anode layer to form a lithium metal layer on the lithium distribution layer and charge the all solid-state secondary battery,
    wherein the lithium distribution layer has a thickness which is greater than or equal to 1 nanometer and less than or equal to 50 nanometers, and
    wherein the lithium distribution layer consists of zinc.

2. The method of claim 1, wherein before the applying a voltage between the cathode layer and the anode layer, the lithium metal layer is not present in the anode layer.

3. The method of claim 1, wherein the applying a voltage between the cathode layer and the anode layer comprises charging the all solid-state secondary battery, and
    wherein the charging comprises precipitating the lithium metal layer on a surface of the lithium distribution layer facing the solid electrolyte layer.

4. The method of claim 1, wherein the lithium metal layer is formed on a surface of the lithium distribution layer.

5. The method of claim 1, wherein the solid electrolyte layer is a porous sulfide solid electrolyte layer and the porous sulfide solid electrolyte layer comprises $Li_2S$—$P_2S_5$, $Li_2S$—$P_2S_5$—LiX wherein X is I or Cl, $Li_2S$—$P_2S_5$—$Li_2O$, $Li_2S$—$P_2S_5$—$Li_2O$—LiI, $Li_2S$—$SiS_2$, $Li2_S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ wherein m and n are integers, and Z is Ge, Zn, or Ga, $Li_2S$—$GeS_2$, $Li_2S$—$SiS_2$—$Li_3PO_4$, $Li_2S$—$SiS_2$-$Li_pMO_q$ wherein p and q are integers, and M is P, Si, or Ge, or a combination thereof.

6. The method of claim 1, wherein the lithium metal layer is a continuous layer on an entire surface of the lithium distribution layer.

7. A method of manufacturing an all solid-state secondary battery, the method comprising:
    providing a cathode layer,
    disposing a solid electrolyte layer on the cathode layer, and
    disposing an anode layer on the solid electrolyte layer and opposite the cathode layer to manufacture the all solid-state battery,
    wherein the anode layer comprises
        an anode collector, and
        a lithium distribution layer consists of zinc, wherein the lithium distribution layer is disposed directly on the anode collector and between the solid electrolyte layer and the anode collector, and wherein the anode collector comprises a different material than that of the lithium distribution layer,
    wherein a diffusion coefficient of lithium in the lithium distribution layer is greater than a diffusion coefficient of lithium in lithium metal during charge of the all solid-state secondary battery,
    wherein the lithium distribution layer has a thickness which is greater than or equal to 1 nanometer and less than or equal to 50 nanometers.

8. The method of claim 7, further comprising charging the all solid-state secondary battery to form a lithium metal layer on the lithium distribution layer.

9. The method of claim 8, wherein the lithium metal layer is a continuous layer on an entire surface of the lithium distribution layer.

10. The method of claim 9, wherein the entire surface of the lithium distribution layer faces the solid electrolyte layer.

* * * * *